(12) United States Patent
Permogorov et al.

(10) Patent No.: US 6,665,069 B1
(45) Date of Patent: Dec. 16, 2003

(54) SPECTRO-TEMPORAL ANALYZER

(75) Inventors: Dmitri Permogorov, Sunnyvale, CA (US); Alexandre Katchanov, Sunnyvale, CA (US); Hoa Pham, Mountain View, CA (US); Gerald P. Coleman, San Jose, CA (US)

(73) Assignee: Blueleaf, Inc., Sunnyvale, CA (US)

( * ) Notice: Subject to any disclaimer, the term of this patent is extended or adjusted under 35 U.S.C. 154(b) by 83 days.

(21) Appl. No.: 10/010,311

(22) Filed: Nov. 9, 2001

(51) Int. Cl.⁷ .................................................. G01J 3/28
(52) U.S. Cl. ......................................... 356/328; 356/305
(58) Field of Search ................................. 356/328, 308, 356/305

(56) References Cited

U.S. PATENT DOCUMENTS 3,730,629 A * 5/1973 Rentzepis .................... 356/300
4,630,925 A * 12/1986 Schiller et al. .............. 356/328
5,371,358 A * 12/1994 Chang et al. ................ 250/226
2002/0176071 A1 * 11/2002 Fontaine ..................... 356/73.1

* cited by examiner

Primary Examiner—Zandra V. Smith
Assistant Examiner—Kara Geisel
(74) Attorney, Agent, or Firm—John Schipper; Herb Burkard

(57) ABSTRACT

System and method for simultaneously providing a wavelength spectral distribution and a temporal distribution of an incident light beam. The light beam is received at a wavelength spectral distribution module and is separated into light beam segments corresponding to at least two different wavelengths in a first selected direction transverse to beam propagation direction. The light beam is also received at a temporal distribution module, and segments of the light beam are distributed corresponding to at least two different times at which light in the beam was produced, in a second selected direction that is substantially perpendicular to the first direction. The temporal distribution module may include a rotating segmented mirror.

20 Claims, 2 Drawing Sheets

SPECTRO-TEMPORAL ANALYZER

FIELD OF THE INVENTION

This invention relates to simultaneous time resolution and wavelength determination of a light beam.

BACKGROUND OF THE INVENTION

Determination of the spectral characteristics of a light beam, particularly for visible light, has been performed for several centuries. Determination of temporal characteristics of a light beam has been possible more recently, with development of fast response light beam analyzers that can analyze beams over time intervals having durations of the order of nanoseconds (nsec) or less. Until recently, no serious need existed to analyze and provide simultaneous information on spectral and temporal characteristics of a light beam over closely spaced time intervals. Existing spectral measurement devices will provide a measurement of the spectral content of a light beam, accumulated over a time interval with a duration of the order of seconds to minutes; and a temporal measurement device will provide an aggregated measurement of light energy over a band of wavelengths for a time interval of the order of sub-nanoseconds ($\mu$sec) to milliseconds (msec), but with no cooperative action.

What is needed is a system that rapidly, simultaneously and accurately determines both spectral and temporal characteristics for a laser beam or other narrow light beam, for individual wavelengths spaced apart by small wavelength increments (e.g., $\Delta\lambda \approx 0.01$–10 nm) over a wavelength range of the order of hundreds of nm and over a measurement time interval of the order of sub-milliseconds.

SUMMARY OF THE INVENTION

These needs are met by the present invention, which provides a system and method for simultaneously measuring and providing readings for intensity and wavelength(s) of a light beam and the time interval during which such wavelength(s) was present. The system can track changes in light beam intensity and/or wavelength(s) over a sequence of non-overlapping time intervals, each of length 10–1000 $\mu$sec, or over larger time intervals if desired. The system separates wavelength or spectral distribution in a light beam (oriented in a first direction) from temporal distribution (oriented in a second direction) and repeats this separation at time intervals that are spaced apart by 10–1000 nsec.

DESCRIPTION OF BEST MODES OF THE INVENTION

Figure 1:
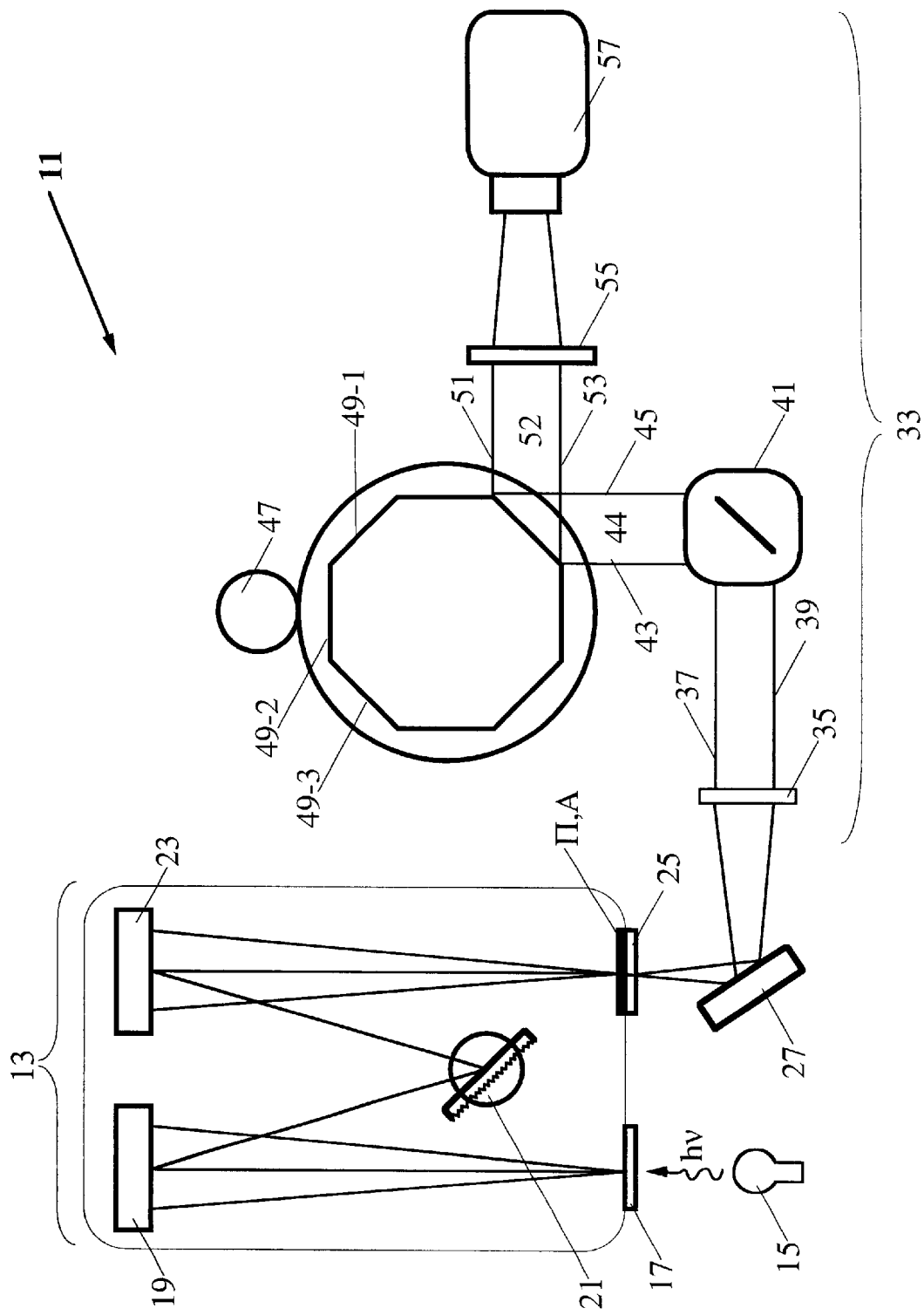
FIG. 1 schematically illustrates an embodiment of the invention.

FIG. 1 schematically illustrates one embodiment of a system 11 for practicing the invention. The spectrophotometer unit 13 of the system 11 includes a horizontally adjustable vertical aperture input slit 17, a collimating mirror 19, a uniquely configured diffraction grating 21, a focusing mirror 23 and a vertically adjustable exit aperture or output slit 25. A light beam hv enters the system at a light entrance window and associated entrance slit 17 and forms an image of the entrance slit in an optical focal plane of the focusing mirror 23.

Positioning of the adjustable vertical aperture slit 17 provides control of spectral resolution of the light beam; positioning of the vertically adjustable horizontal aperture output slit 25 provides control of the time resolution of the light beam. The temporal resolution unit 33 includes a telescope objective lens 35 and telescope ocular lens 55 with a selected magnification; a periscope 41 that rotates the light beam emitted by the spectrometer unit 13 by a selected angle, preferably 90°; a segmented mirror 49 that rotates rapidly with angular velocity $\omega$; (preferably, at least $2\pi \cdot 10^3/$M, where M is the number of mirror segments) and an image recording system 57, such as a CCD array that is sensitive to near-infrared wavelengths.

A light beam hv, provided by a light source 15, such as a laser, is received by a vertical aperture input slit 17, having a manually variable width, and by a collimating mirror 19. The width of the slit 17 defines or limits the working resolution of the spectrometer unit, as well as the total amount of light entering the spectrometer 13. As the input slit width w decreases, less light enters the spectrometer portion but the spectral resolution is increased. A balance must be achieved that neither over-saturates the image array nor provides too little light for a reliable image, and the spectral resolution is high enough to resolve all necessary spectral features of the light provided by the source 15.

Preferably, light received by the imaging array should vary linearly with the intensity of light incident on the array. The saturation limit of the recorder and the maximum output power of the light source 1 are known or determinable. If the saturation limit of the recorder is less than the maximum output power of the light source 15, a light attenuator, such as a neutral density filter (not explicitly shown in FIG. 1), may be positioned in front of the slit 17, or between the slit and the imaging array 57.

The collimated light beam produced by the mirror 19 is received by an echelle type diffraction grating 21, which diffracts only one order of the light beam onto a focusing mirror 23 and through an exit aperture 25 having a manually variable height. An echelle grating is a high angle grating that provides high resolution and dispersion and whose (reduced) free spectral range is greater than the free spectral range of a Fabry-Perot etalon or a reflection echelon. Preferably, the order of diffraction M is at least 10. The angle between the incident light beam and the diffracted light beam is usually quite small, no more than 5°–10°, to minimize image distortion. The reduction of the free spectral range is not a problem where the light source is a laser having a spectral line width of no more than a few nanometers (nm) and the overall changes in wavelength of the incident light beam are less than 100 nm. The lower free spectral range is compensated for by the much higher resolution power of the spectrometer portion, because higher orders of diffraction are used.

Choice of a selected portion of the wavelength band is achieved by adjusting the angular orientation of the grating 21 relative to the incident light beam received from the collimating mirror 19. An image of the input slit 17 is formed in a focal plane Π of the focusing mirror 23 and includes a portion of the wavelength range of the light received at the input slit 17. By adjusting the angle of the grating 21 relative to an axis of the collimating mirror 19, the entire wavelength range of light received at the input slit 17 can be accommodated.

The light beam, as processed by the diffraction grating 21 and focused by the mirror 23, is received and passes through the exit aperture 25, whose manually variable height defines the time resolution of the system, as hereafter discussed in the following. Diffracted light from the grating 21 has a spectrum and forms an image in a focal plane Π of the mirror 25, which focal plane coincides with the plane of the exit aperture 25. If the light beam received at the input slit 17 is not monochromatic but has a spectral width $\Delta\lambda$ ($\approx$a few nm), the image of the input slit will be extended in the horizontal direction (parallel to the plane of the paper in FIG. 1) in the focal plane Π. The height of the input slit image will be equal to the height of the illuminated part of the input slit 17.

The intensity distribution, along the horizontal axis, of light received at the focal plane Π corresponds to the wavelength distribution of incident light provided by the light source 15. If this incident light includes two or more spaced apart wavelengths, each wavelength of light received at the focal plane Π is spatially separated. If a linear light recording array A is placed in the focal plane Π, one can record a distribution representing the spectrum of the light incident on the input slit 17. The linear array A may include several thousand pixels, each of diameter d$\approx$5–50 $\mu$m, and each pixel can record the light intensity with 12-bit resolution (minimum-to-maximum intensity ratio of 1:4096). By positioning the array A at the focal plane Π, one can obtain an intensity distribution of wavelengths of the light provided by the light source 15.

Figure 2:
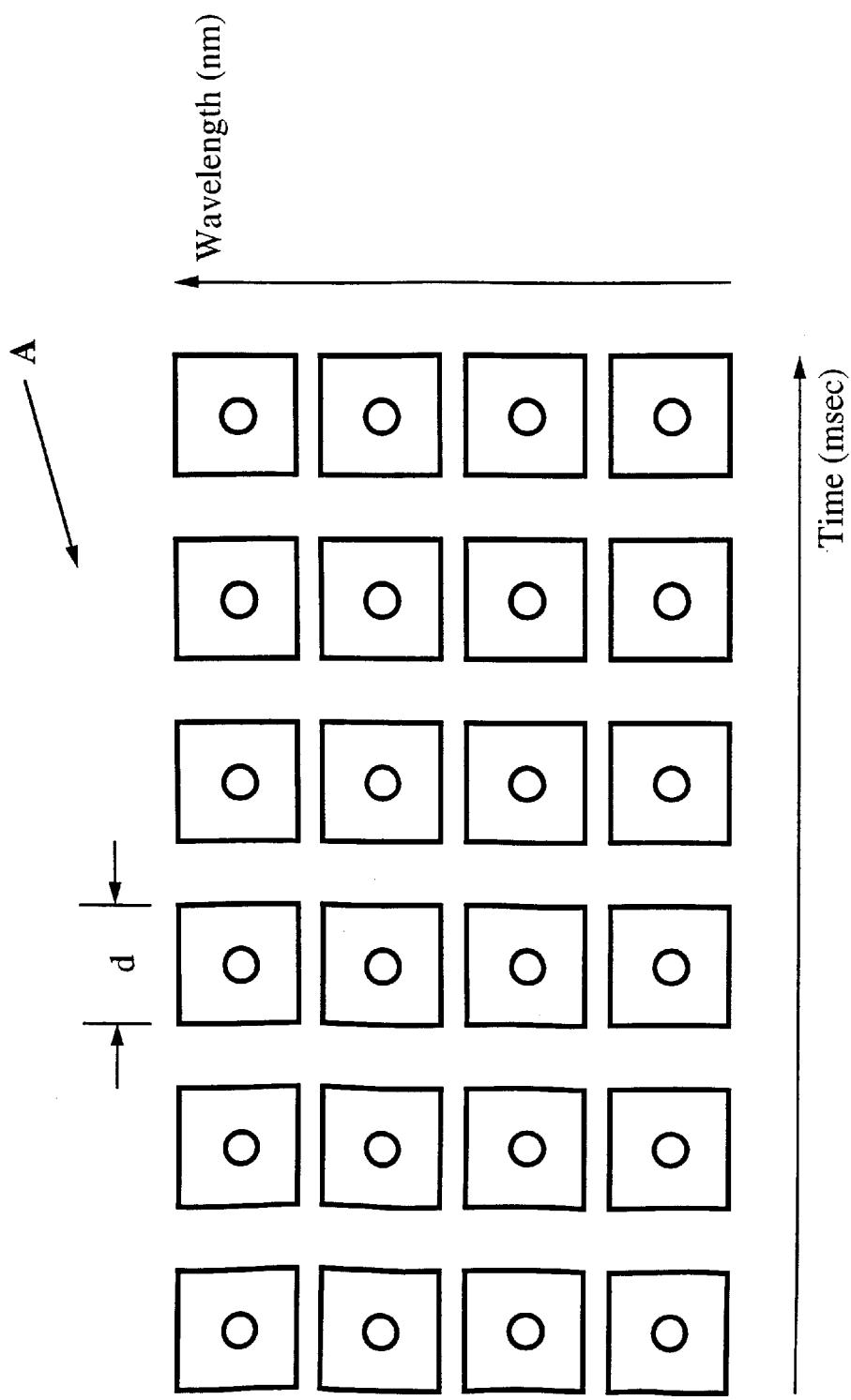
FIG. 2 illustrates use of a two-dimensional rectangular array of light-receiving devices according to the invention.

A system user may also wish to monitor temporal changes in intensity for one or more wavelengths in the incident light, and to process and display this information quickly. Each pixel along a line in the array A corresponds to a different wavelength of the incident light. Measuring and recording the light intensity value from each such pixel requires a significant time interval (at least 10 $\mu$sec with current technology) to perform so that no more than 4,000 pixels in a single horizontal line can be read in a time interval of a selected length, such as 0.01 sec. A solution to this limitation, incorporated in the present invention, provides a two-dimensional array A of pixels in a rectangular pattern (FIG. 2) and spatially shifts the wavelength spectrum from one horizontal line to another line (e.g., an adjacent line) as time increases. With this approach adopted, each horizontal line of pixels corresponds to the wavelength spectrum of the incident light at a different time, and each vertical line of pixels corresponds to a selected wavelength at a sequence of times. The pixel diameter in the array A can vary from about 5 $\mu$m to about 50 $\mu$m and depends upon the CCD manufacturer.

With the linear array A removed or moved so that this array does not interfere with the passage of light through the exit aperture 25, the light beam is reflected by a planar mirror 27 (optional) and is received and focused by a telescope objective lens sub-system 35 or another optical sub-system of similar construction. The mirror 27 (optional) changes the direction of the light beam by a selected angle (e.g., by 90°); inclusion of the mirror 27 can provide a more compact system, and is therefore preferred, but is not required for system operation. Light beam segments oriented at different angles when received at the focal plane Π, corresponding to different wavelengths, will be collimated but spaced apart (e.g., as beam segments 37 and 39) in the telescope objective lens 35. The collimated light beam issuing from the telescope objective lens 35 is received by a periscope 41 or other light reflecting optical sub-system and is directed in another direction (e.g., with a 90° rotation).

The spatially separated light beam segments in the focal plane Π, corresponding to different wavelengths, form a horizontally extended image at the input slit 17. The vertically adjustable output aperture 25 determines the vertical dimension of the image of the input slit 17 and is preferably approximately equal to the dimension of a pixel on the CCD array 57. In this situation, a typical height of the output aperture 25 is 40–150 $\mu$m, and the image of the input slit 17 at the focal plane Π is about 100 $\mu$m in height by 10 mm in width. This image is re-imaged on a single line in the CCD array 57 by the telescope objective 35 and telescope ocular 55, through the periscope 41 and the rotating mirror 49. The optical parameters of the telescope objective 35 and the telescope ocular 55 are chosen to achieve an appropriate magnification with the telescope.

The telescope objective 35 forms a collimated beam 37/39 of the image of the input slit 17 in the focal plane Π. Each spatial point along a horizontal axis of the image of the input slit 17 in the focal plane Π has a different wavelength, corresponding to a different part of the collimated beam 37/39 and corresponds to a different angle relative to the optical axis of the telescope. Spatial points of the image of the input slit 17 in the focal plane Π that have the same wavelength and the same vertical spatial location have a very small numerical aperture in a vertical dimension and can be represented by a single angle relative to the optical axis. Thus, after the image is rotated by the periscope and is reflected in one of the facets of the rotating mirror 49, the telescope ocular 55 focuses the beam 51/53 onto the CCD array 57. At a given time (e.g., t=t0), only one vertical line VL of pixels is illuminated on the two-dimensional CCD array 57. At time t0, no other vertical line of pixels is illuminated, and only the pixels in the line VL provide an active signal. At another time, t=t0 +$\Delta$t, the rotating mirror 49 turns by an angle $\Delta\alpha \propto \omega\Delta t$, and a different vertical line VL' (but not the line VL) of pixels in the CCD array 57 is illuminated, corresponding to a different image line of the input slit 17 at the focal plane Π. By appropriate choice of the quantity $\omega\Delta t$, the pixel line VL' is displaced from the pixel line VL by a center-to-center separation of two adjacent pixel lines in the CCD array 57.

After substantially all pixels in the array 57 have been exposed once, the pixel values are measured and recorded, and the pixels are recycled or retriggered (possibly including pixel "dead time") for the next round of pixel exposures as the mirror 49 continues to rotate. Where the CCD array has M vertical lines of pixels, the time frame for exposure of all M lines will be approximately t0$-\Delta$t/2$\leq$t$\leq$t0+(M$-$1/2)$\Delta$t. Preferably, the vertical lines of pixels are activated a few $\mu$sec before the time t=t0$-\Delta$t/2 and are inactivated and recycled a few $\mu$sec after the time t=t0+(M$-$1/2)$\Delta$t. The pixel exposure times are synchronized with the rotation of the mirror 49. The rotating mirror 49 can operate with as few as one or two facets, if desired, but preferably has K facets, with K$\geq$3, for example, K=8, to achieve better equilibrium.

The rapidly rotating segmented mirror 49 serves as the temporal dispersal element. Preferably, the axis of rotation of the rotating segmented mirror 49 is vertically oriented. At the focal plane Π, the time dispersal direction coincides with the wavelength dispersal direction (vertical). Insertion of the periscope 41 in the light beam path rotates the wavelength dispersal direction by 90° so that the resulting wavelength dispersal direction is now vertical, and thus perpendicular to the (horizontal) direction of time dispersal. The variable height of the exit aperture 25 allows adjustment of the vertical size of the image in the focal plane Π to correspond approximately to the diameter of a pixel in the CCD array 57, after taking account of the magnification factor of the combined telescope objective lens 35 and telescope ocular lens 55.

The temporal resolution unit includes the planar mirror 27, the telescope objective lens sub-system 35, the periscope 41, the segmented rotating mirror 49, the telescope ocular lens sub-system 55 and the CCD array 57. Final images of the spectral and temporal behavior of the light beam are recorded by the CCD array 57. An approximately rectangular pattern of light corresponding to a wavelength interval at a particular time, repeatedly sweeps across the rectangular array 57 of pixels as the segmented rotating mirror 49 rotates about its (vertical) axis.

What is claimed is:

1. A system for simultaneously providing a wavelength spectral distribution and a temporal distribution of an incident light beam, the system comprising:

a wavelength spectral distribution module that receives a light beam and provides wavelength-distributed segments of the light beam corresponding to at least two different wavelengths in a first selected direction transverse to a light beam propagation direction; and a temporal distribution module that receives the light beam and distributes segments of the light beam corresponding to at least two different times at which light in the beam was produced, in a second selected direction that is substantially perpendicular to the first direction.

2. The system of claim 1, wherein said temporal distribution module comprises a periscope.

3. The system of claim 1, wherein said spectral distribution module comprises a diffraction grating that receives said light beam and separates said light beam into at least two of said wavelength-distributed segments.

4. The system of claim 3, wherein said grating is an echelle grating.

5. The system of claim 3, wherein said grating receives said light beam and provides at least one of said wavelength-distributed segments in a diffraction order M, with $M \geq 10$.

6. The system of claim 3, wherein said grating receives said light beam and provides a grating output light beam having at most one diffraction order.

7. The system of claim 1, wherein said temporal distribution module further comprises a rotating mirror, having at least one mirror segment and rotating with a selected angular velocity $\omega$, wherein each mirror segment receives said light beam from said spectral distribution module and reflects said light beam in a selected direction.

8. The system of claim 7, further comprising a two-dimensional array of light receiving elements that is positioned so that each element receives said light beam from said temporal distribution module as said mirror rotates through a selected angle.

9. The system of claim 8, wherein said light receiving elements are arranged in at least a first line and in a second line that is substantially perpendicular to the first line, wherein two different elements in the first line correspond to two different wavelengths received in said light beam and two different elements in the second line correspond to portions of said light beam received at two different times.

10. The system of claim 8, wherein said mirror has M mirror segments ($M \geq 1$) and said angular velocity $\omega$ is selected to be at least $2\pi \cdot 10^3/M$ rad/sec.

11. A method for simultaneously providing a wavelength spectral distribution and a temporal distribution of an incident light beam, the method comprising:

receiving a light beam at a wavelength spectral distribution module and providing wavelength-distributed segments of the light beam corresponding to at least two different wavelengths in a first selected direction transverse to a light beam propagation direction; and receiving the light beam at a temporal distribution module and distributing segments of the light beam corresponding to at least two different times at which light in the beam was produced, in a second selected direction that is substantially perpendicular to the first direction.

12. The method of claim 11, further comprising providing, for said temporal distribution module, a periscope.

13. The method of claim 11, further comprising providing, as part of said spectral distribution module, a diffraction grating that receives said light beam and separates said light beam into at least two of said wavelength-distributed segments.

14. The method of claim 13, further comprising providing an echelle grating as said grating.

15. The method of claim 13, further comprising arranging for said grating to receive said light beam and to provide at least one of said wavelength-distributed segments in a diffraction order M, with $M \geq 10$.

16. The method of claim 13, further comprising arranging for said grating to receive said light beam and to provide a grating output light beam having at most one diffraction order.

17. The method of claim 11, further comprising providing, for said temporal distribution module, a rotating mirror, having at least one mirror segment and rotating with a selected angular velocity $\omega$, wherein each mirror segment receives said light beam from said spectral distribution module and reflects said light beam in a selected direction.

18. The method of claim 17, further comprising providing a two-dimensional array of light receiving elements that is positioned so that each element receives said light beam from said temporal distribution module as said mirror rotates through a selected angle.

19. The method of claim 18, further comprising arranging said light recieving elements in at least a first line and in a second line that is substantially perpendicular to the first line, wherein two different elements in the first line correspond to two different wavelenghts received in said light beam and two different elements in the second line correspond to portions of said light beam received at two different times.

20. The method of claim 18, further comprising providing said mirror with M segments ($M \geq 1$) and selecting said angular velocity $\omega$ to be at least $2\pi \cdot 10^3/M$ rad/sec.

* * * * *